United States Patent [19]

Lettington et al.

[11] 4,154,503

[45] May 15, 1979

[54] INFRA RED TRANSMITTING GLASSES

[75] Inventors: Alan H. Lettington; James A. Savage, both of Malvern, England

[73] Assignee: The Secretary of State for Defence in Her Britannic Majesty's Government of the United Kingdom of Great Britain and Northern Ireland, London, England

[21] Appl. No.: 811,414

[22] Filed: Jun. 29, 1977

[30] Foreign Application Priority Data

Jul. 1, 1976 [GB] United Kingdom ............... 27359/76

[51] Int. Cl.$^2$ .................. C03C 13/00; C03C 3/12; C03C 3/30
[52] U.S. Cl. .................. 350/96.34; 350/1.1; 106/47 Q; 106/50
[58] Field of Search ............ 106/47 Q, 47 R, 50; 350/96 M, 96.34, 1.1

[56] References Cited

U.S. PATENT DOCUMENTS

| 3,209,641 | 10/1965 | Upton | 106/47 R |
| 3,371,210 | 2/1968 | Brau et al. | 106/47 R |
| 3,771,073 | 11/1973 | Krause | 106/47 R |
| 3,920,461 | 11/1975 | Asahara et al. | 106/47 Q |

FOREIGN PATENT DOCUMENTS 140544 7/1960 U.S.S.R. ................. 106/47 Q

OTHER PUBLICATIONS

Savage; J. A. et al., "Preparation of glasses transmitting in the infra-red between 8 and 15 microns", in Physics and Chemistry of Glasses, vol. 5, No. 3, Jun. 1964, pp. 82-86.

*Primary Examiner*—O. R. Vertiz
*Assistant Examiner*—Mark Bell
*Attorney, Agent, or Firm*—Pollock, Vande Sande and Priddy

[57] ABSTRACT

An infra red transmitting glass has up to 30 atomic percent of telluride substituted for selenide in a glass within the following range:
    germanium: 10–35 atomic percent
    arsenic: 9–45 atomic percent
    selenide: 45–70 atomic percent The glass may be formed into infra red lenses or formed into infra red transmitting fibres using two slightly different glasses from the above range for the core and cladding of each fibre.

4 Claims, 2 Drawing Figures

INFRA RED TRANSMITTING GLASSES

This invention relates to optical glass materials capable of transmitting infra red radiation.

Various infra red transmitting glasses are known and are used in the lens systems of infra red, or thermal imaging systems. In these infra red imaging systems the infra red, or thermal radiation from a scene is focussed onto a detector whose output is proportional to the change of radiation received. By scanning the scene in a raster manner a picture of the scene can be display on a cathode ray tube.

The material used in the lens system is frequently germanium formed into a single lens and this is adequate for many purposes. However for high resolution the small degree of chromatic aberration in germanium limits the optical performance of the lens. Therefore the chromatic aberration in germanium must be corrected by means of an additional lens component made from another material. Such a material could be a glass from the GeAsSe ternary system as described in Journal of Non-Crystalline Solids 20 (1976) 271-283, P. J. Webber and J. A. Savage.

According to this invention an infra red transmitting glass has up to 30 atomic percent of telluride substituted for selenide in a glass having a composition within the following range:

germanium: 10-35 atomic percent
arsenci: 9-45 atomic percent
selenide: 45-70 atomic percent Preferably the glass range is within the area defined and bounded by the lines joining the following compositions in the GeAsSe ternary diagram expressed in atomic percentages $Ge_{22}As_9Se_{69}$, $Ge_{35}As_9Se_{56}$, $Ge_{35}As_{20}Se_{45}$, $Ge_{15}As_{40}Se_{45}$.

The addition of Te increases the refractive index and decreases the dispersion between 8 and 12 $\mu$m. Also the optical absorption co-efficient between 8 and 12.0 $\mu$m is reduced sufficiently that infra red transmitting fibre optic components may be made.

The invention will now be described by way of example only with reference to the accompanying drawings of which:

Figure 1:
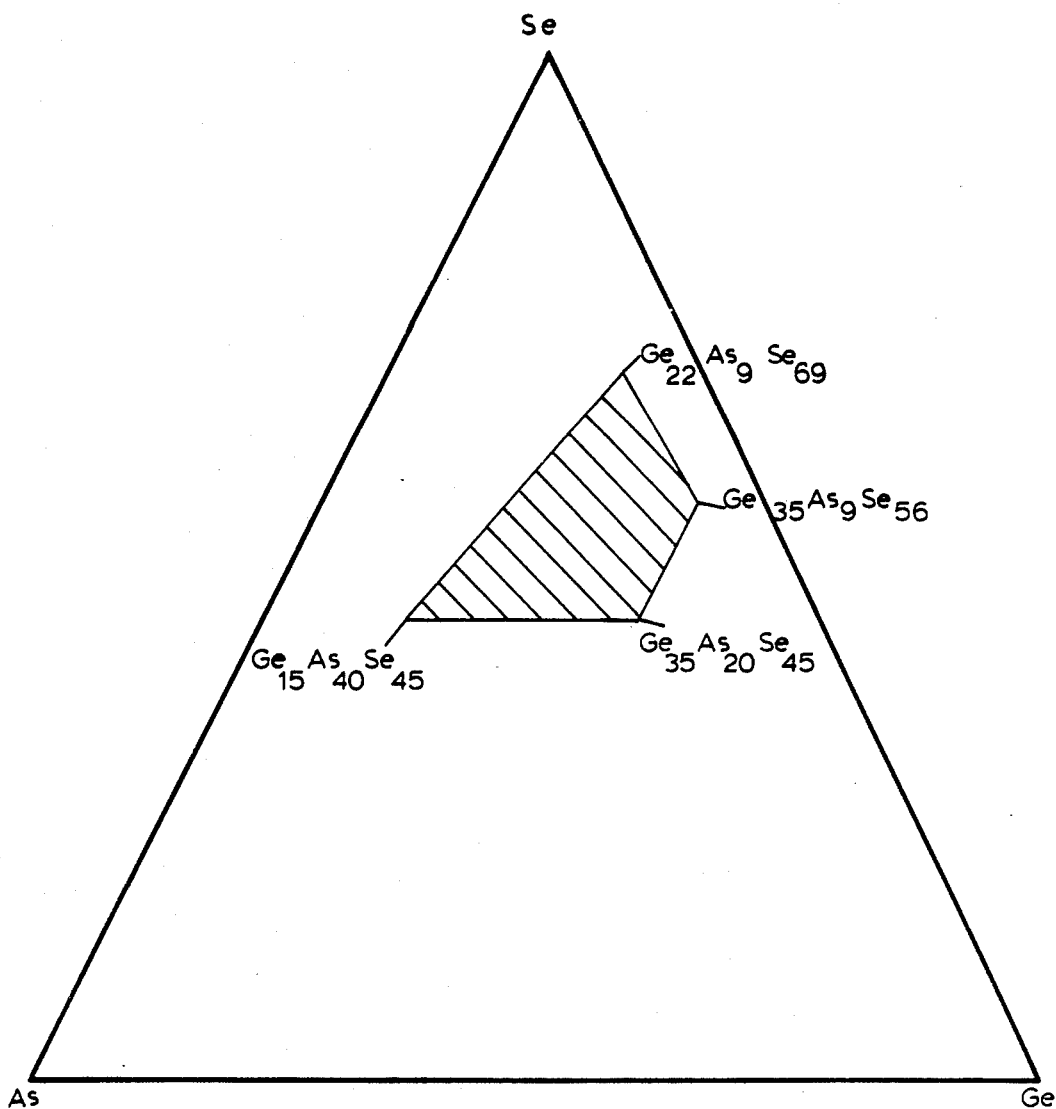
FIG. 1 is a ternary diagram showing the preferred area of GeAsSe on which glass according to this invention is based.

FIG. 1 shows a standard ternary diagram for Ge, As, Se in which the shaded area represents the base composition of an infra red transmitting glass. Not shown on the diagram is the fact that up to 30% Te is substituted for Se. The glasses in the ternary area shown are selected as suitable for the applications here defined because the glass transition temperatures $\geq 250°$ C., the thermal expansion coefficients are $\leq 17 \times 10^{-6}/°$ C. between 30° C. and 180° C. and the thermal stabilities as determined by differential thermal analysis are sufficient for commercial exploitation. The addition of up to 30% of Te substituted for Se in any of the base compositions within the defined area increases the reciprocal dispersive power $\gamma$ where $\gamma = (n_{10} - 1)/(n_8 - n_{12})$; ($n_8$, $n_{10}$, $n_{12}$ are the refractive indices at 8, 10, 12 $\mu$m respectively).

The physical parameters of a series of compositions for a particular base glass $Ge_{30}As_{13}Se_{57}$ are listed below by way of an example.

| | Tg | $\alpha \times 10^{-6}$ | RI | $\gamma$ |
|---|---|---|---|---|
| $Ge_{30}As_{13}Se_{57}$ | 342 | 13.0 | 2.4724 | 110 |
| $Ge_{30}As_{13}Se_{47}Te_{10}$ | 308 | 13.2 | 2.5897 | 129 |
| $Ge_{30}As_{13}Se_{37}Te_{20}$ | 285 | 12.9 | 2.7178 | 154 |
| $Ge_{30}As_{13}Se_{27}Te_{30}$ | 262 | 12.8 | 2.8563 | 185 |
| $Ge_{30}As_{13}Se_{30}Te_{27}$ | 269 | 12.8 | 2.813 | — |

Tg is the glass transition temperature ° C., $\alpha \times 10^{-6}$ is the thermal expansion coefficient between 30° C. and 180° C., RI is the refractive index at 10.0 $\mu$m and $\gamma = (n_{10} - 1)/(n_8 - n_{12})$; (where $n_8$, $n_{10}$, $n_{12}$ are the refractive indices at 8, 10, 12 $\mu$m).

Glass may be prepared by melting of its elemental constituents followed by controlled cooling as detailed in Journal of Non-Crystalline Solids 20 (1976) pages 271-283 but it is essential to reduce oxide impurity to less than 2 ppm weight in the glass to avoid optical absorptions between 8 and 12 $\mu$m due to the presence of oxide. Glass with an oxide content of the order of 1 ppm weight has been consistently prepared as follows. Electronic grade arsenic and selenium elemental materials were baked in vacuum, at 300° C. and $10^{-2}$ torr, to remove surface oxide and electronic grade tellurium was etched in 6% Bromine/Hydrobromic acid to remove surface oxides. The time of bake out was typically 1 hour and that of etching 3 minutes but these times were dependent on the amount of surface oxide to be removed from the raw materials. The semiconductor grade germanium (30 ohm cm) was used as received. All of these raw materials were then passed through an evacuatable entry port into an argon filled glove box.

A silica test tube was connected to a vacuum system by means of a demountable tap and was evacuated at $10^{-5}$ torr and 450° C. for 1 hour to outgas the inside surfaces of the tube. After cooling under vacuum the tap was closed and the whole assembly transferred through a vacuum entry port into a continuously flushed argon glove box. Inside the glove box the elements were crushed to a particle size of 8-10 mm inside individual steel percussion mortars. After weighing, the elements were loaded into the outgassed silica tube after removal of the tap. After reassembly the filled melt tube was passed out of the glove box and re-evacuated to $10^{-5}$ torr for 3 hours before sealing with an oxyhydrogen torch. The sealed tube was loaded into a furnace and rocked and rotated while being heated at 970° C. for about 16 hours. The temperature was then reduced to 850° C. for 2 to 3 hours and finally the tube was air quenched inside an insulated container. When cool this partially annealed boule was cut from the melt tube and reannealed to optical standards before subsequent cutting into components.

Glasses made according to this invention may be formed into infra red transmitting fibre optic components offering useful transmissions between 8 and 12 $\mu$m and also between 3 and 5 $\mu$m.

These fibre components become feasable at 8-12 $\mu$m due to the preparation technique which results in low oxide impurity absorptions and due to the substitution of Te for Se which reduces the intrinsic multiphonon absorptions. For example a 50 $\mu$m core glass in a fibre optic could be $Ge_{30}As_{13}Se_{27}Te_{30}$ and the cladding glass $Ge_{30}As_{13}Se_{30}Te_{27}$ at a thickness of 5 to 10 $\mu$m. Techniques for making fibre optics are described in Infra Red Physics 1965, Vol. 5, pages 69-80.

Figure 2:
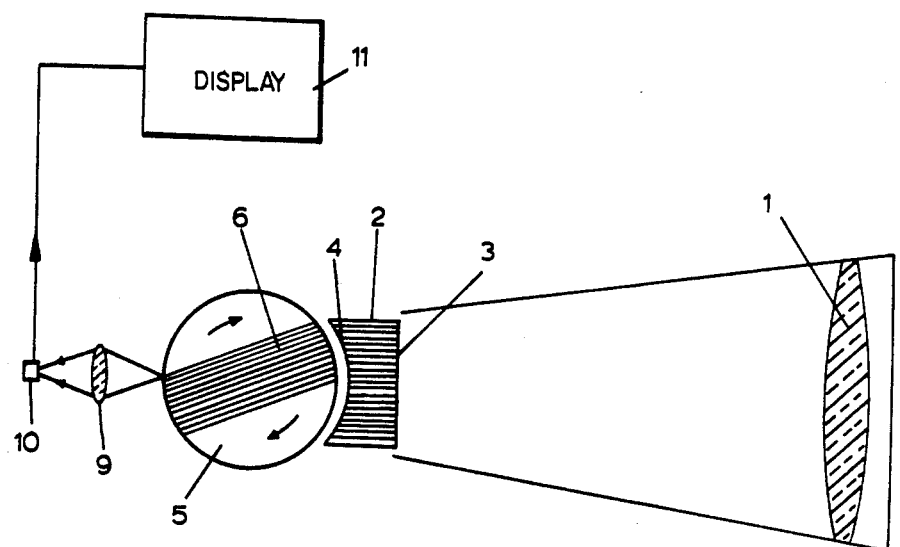
FIG. 2 is a diagrammatic view showing an infra red imaging system.

When formed into fibres the glass may be bundled together and held in an epoxy matrix or binder to form a bundle of fibres. Alternatively by heating of the fibres the cladding may soften sufficiently to cause individual fibres to bind together without the need for a binding matrix. In this case the softening temperature of the cladding must be below that of the core glass. FIG. 2 shows how a bundle of infra red transmitting glass fibres may be used in an infra red imaging system.

As shown infra red radiation from a scene is collected and focussed by a lens 1 onto a fibre optic correction plate 2. This plate 2 comprises numerous fibres of infra red transmitting glass held parallel to one another in a glass binder with the fibre lengths perpendicular to the flat front face 3 of the plate. The rear 4 of the plate is of a cylindrical curvature. Behind the plate 2 is a cylindrically shaped rotor 5 comprising a bundle 6 of infra red transmitting fibres arranged parallel to one another in a binder. The remainder of the rotor 5 is of lightweight plastic material, the rotor being supported on a rotor spindle for rotation in the direction of the illustrated arrows by an electric motor (not shown).

Behind the rotor 5 is a lens 9 which focusses images from the rotor onto a linear detector array 10 whose output is used to form a display in a conventional manner e.g. on a cathode ray tube 11. The number of elements in the array is equal to the number of lines in the scene, thus for a clear display as large a number as possible is used, typically 200 detector elements.

When the rotor 5 is rotated the image on the correction plate 2 is swept across the detector array 10 twice per revolution. The rotor periphery is equispaced from the rear face 4 of the plate 2 resulting in good transmission of the image between the plate and the rotor because the image leaves and enters the fibres normal to their end surfaces. The displayed scene may be interlaced by tilting the axis of the fibres 6 relative to the axis of the rotor 5.

As shown the rotor diameter is about $\sqrt{2}\times$ width of the image on the correction plate 2, the width of the fibre bundle is about half the image width, and the height of the fibre bundle is the height of the image. Such a rotor has a dead time of about 75%. For a smaller drum, equal to the image width on the plate 2, the dead time is about 50% but a loss in definition can occur at the edge of the displayed image.

The infra red imaging system of FIG. 2 is described in co-pending U.K. Patent Application No. 27,358/76, corresponding to Lettington et al U.S. application Ser. No. 811,415 filed June 29, 1977, for "Imaging Systems".

What we claim is:

1. In an infra red transmitting optical glass member having facing first and second surfaces through which infra red radiation may pass, the glass in said member having a composition within the following range:

germanium: 10–35 atomic percent
arsenic: 9–45 atomic percent
selenide: 45–70 atomic percent the improvement wherein an amount of telluride, up to 30 atomic percent telluride, sufficient to increase the refractive index of said optical glass member and to decrease the dispersion of the glass in said member between 8 and 12 $\mu$m is substituted for selenide in the glass of said member, the minimum amount of selenide being at least about 27 atomic percent.

2. An infra red transmitting optical glass member according to claim 1 in which said amount of telluride is substituted for selenide in a glass which constitutes said member and has a composition within the range defined by the area bounded by lines joining the following compositions in the GeAsSe ternary diagram expressed in atomic percentages:

$Ge_{22}As_9Se_{69}$; $Ge_{35}As_9Se_{56}$; $Ge_{35}As_{20}Se_{45}$; $Ge_{15}As_{40}Se_{45}$.

3. An infra red transmitting optical glass member according to claim 1 formed into an infra red transmitting lens.

4. In an infra red transmitting glass having a composition within the range defined by the area bounded by lines joining the following compositions in the GeAsSe ternary diagram expressed in atomic percentages:

$Ge_{22}As_9Se_{69}$, $Ge_{35}As_9Se_{56}$, $Ge_{35}As_{20}Se_{45}$, $Ge_{15}As_{40}Se_{45}$;

the improvement wherein an amount of telluride, up to 30 atomic percent telluride, sufficient to increase the refractive index of the glass and to decrease the dispersion of the glass between 8 and 12 $\mu$m is substituted for selenide in said glass, said glass being formed into a fibre core of a first composition and a first refractive index selected from said range clad with a cladding layer of a second and different composition and different refractive index selected from said range.

* * * * *